US010606874B2

(12) United States Patent
Braham et al.

(10) Patent No.: US 10,606,874 B2
(45) Date of Patent: *Mar. 31, 2020

(54) ADJUSTING SEARCH RESULTS BASED ON USER SKILL AND CATEGORY INFORMATION

(71) Applicant: INTERNATIONAL BUSINESS MACHINES CORPORATION, Armonk, NY (US)

(72) Inventors: Adam D. Braham, Rochester, MN (US); Doyle J. McCoy, Rochester, MN (US); Jeffrey A. Schmidt, Rochester, MN (US); Gregory J. Watts, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 522 days.

This patent is subject to a terminal disclaimer.

(21) Appl. No.: 15/407,927

(22) Filed: Jan. 17, 2017

(65) Prior Publication Data

US 2017/0124183 A1 May 4, 2017

Related U.S. Application Data

(63) Continuation of application No. 13/750,365, filed on Jan. 25, 2013, now Pat. No. 9,613,131.

(51) Int. Cl.
*G06F 16/33* (2019.01)
*G06F 16/332* (2019.01)
(Continued)

(52) U.S. Cl.
CPC .......... *G06F 16/334* (2019.01); *G06F 16/338* (2019.01); *G06F 16/3326* (2019.01); *G06F 16/9535* (2019.01)

(58) Field of Classification Search
CPC .. G06F 16/334; G06F 16/9535; G06F 16/338; G06F 16/3326
See application file for complete search history.

(56) References Cited

U.S. PATENT DOCUMENTS 6,785,671 B1   8/2004   Bailey et al.
7,421,424 B2   9/2008   Tago et al.
(Continued)

FOREIGN PATENT DOCUMENTS

EP   1320042   6/2003

OTHER PUBLICATIONS

Notice of Allowance dated Apr. 5, 2017 in related U.S. Appl. No. 15/399,199, 13 pages.
(Continued)

*Primary Examiner* — Jorge A Casanova
(74) *Attorney, Agent, or Firm* — William H Hartwell; Andrew M. Calderon; Roberts Mlotkowski Safran Cole & Calderon, P.C.

(57) ABSTRACT

An approach for adjusting ranked search results based on user data is provided. An approach includes: receiving a search query from a search user; generating a ranked result set based on the search query; generating an adjusted ranked result set by adjusting the ranked result set based on a skill rating of the search user; and providing the adjusted ranked result set to the search user.

19 Claims, 4 Drawing Sheets

(51) Int. Cl.
*G06F 16/338* (2019.01)
*G06F 16/9535* (2019.01)

(56) References Cited

U.S. PATENT DOCUMENTS

| | | | |
|---|---|---|---|
| 7,640,232 B2 | 12/2009 | Fish et al. | |
| 7,779,013 B2 | 8/2010 | Chi et al. | |
| 7,801,885 B1 | 9/2010 | Verma | |
| 7,827,170 B1* | 11/2010 | Horling | G06F 16/24578 707/722 |
| 7,865,496 B1 | 1/2011 | Schiller | |
| 7,904,440 B2 | 3/2011 | Anderson et al. | |
| 8,019,744 B1 | 9/2011 | Roizen et al. | |
| 8,099,417 B2 | 1/2012 | Gollapudi et al. | |
| 8,117,197 B1 | 2/2012 | Cramer | |
| 8,433,778 B1 | 4/2013 | Shreesha et al. | |
| 8,498,974 B1 | 7/2013 | Kim et al. | |
| 8,661,029 B1* | 2/2014 | Kim | G06F 16/24578 707/723 |
| 8,762,373 B1 | 6/2014 | Zamir et al. | |
| 8,782,609 B2 | 7/2014 | Robinson | |
| 8,825,644 B1 | 9/2014 | Crichton et al. | |
| 9,053,195 B2 | 6/2015 | Yang | |
| 2004/0083195 A1 | 4/2004 | McCord et al. | |
| 2006/0173828 A1 | 8/2006 | Rosenberg | |
| 2007/0016545 A1 | 1/2007 | Broder et al. | |
| 2008/0021721 A1 | 1/2008 | Jones et al. | |
| 2008/0104045 A1 | 5/2008 | Cohen et al. | |
| 2008/0221983 A1 | 9/2008 | Ausiannik et al. | |
| 2008/0249890 A1 | 10/2008 | Sower et al. | |
| 2008/0319976 A1 | 12/2008 | Morris et al. | |
| 2009/0119283 A1 | 5/2009 | Muehlbauer et al. | |
| 2010/0010987 A1* | 1/2010 | Smyth | G06F 16/9535 707/E17.014 |
| 2010/0077301 A1 | 3/2010 | Bodnick et al. | |
| 2010/0088331 A1 | 4/2010 | White et al. | |
| 2010/0235338 A1 | 9/2010 | Gabriel | |
| 2011/0004609 A1 | 1/2011 | Chitiveli et al. | |
| 2011/0087661 A1 | 4/2011 | Quick et al. | |
| 2011/0125744 A1 | 5/2011 | Immonen et al. | |
| 2011/0320441 A1 | 12/2011 | Lee et al. | |
| 2012/0084283 A1 | 4/2012 | Chitiveli et al. | |
| 2012/0109860 A1* | 5/2012 | Xu | G06N 20/00 706/12 |
| 2012/0233176 A1 | 9/2012 | Korn et al. | |
| 2012/0278316 A1* | 11/2012 | Reznik | G06F 16/951 707/723 |
| 2012/0278318 A1 | 11/2012 | Reznik | |
| 2012/0310926 A1* | 12/2012 | Gannu | G06Q 30/02 707/723 |
| 2013/0071831 A1 | 3/2013 | Jones et al. | |
| 2013/0132362 A1* | 5/2013 | Jones | G06F 16/951 707/706 |

OTHER PUBLICATIONS

Office Action dated Mar. 6, 2017 in related U.S. Appl. No. 15/399,177, 21 pages.
Final Office Action in related U.S. Appl. No. 15/399,177 dated Sep. 19, 2017, 29 pages.
Notice of Allowance dated Jan. 31, 2018 in related U.S. Appl. No. 15/399,177, 38 pages.
Morris et al., "Team Search: Comparing Techniques for Co-Present Collaborative Search of Digital Media", IEEE Computer Society, 2006, 8 pages.
Garcia-Alvarado et al., "Query Recommendation in Digital Libraries Using OLAP", Keys '10, Inidianapolis, Jun. 6, 2010, 2 pages.
Addison et al., "Evaluating a Computer-Based Information Service", Communicating Information, Proceedings of the 43rd ASIS Annual Meeting, vol. 17, 1981, Abstract only (1 page).

* cited by examiner

ADJUSTING SEARCH RESULTS BASED ON USER SKILL AND CATEGORY INFORMATION

TECHNICAL FIELD

The present invention generally relates to computer-based searching and, more particularly, to adjusting the ranking of search results based on information associated with the search user.

BACKGROUND

A search user within a support domain (e.g., technical support, legal support, medical support, etc.) is often tasked with finding content related to a particular issue or problem. These searching tasks are typically performed locally in pre-configured document repositories rather than over the entire World Wide Web. Authors of documentation in such repositories may have varying ranges of skills, and the skill of the search user in finding the correct documents in such repositories affects the quality of the support provided.

Some search users (also referred to as searchers) are more skilled than others, both with respect to a particular search skill and with respect to a particular search category within a search domain. Even within a particular search category, some search users may be more or less skilled than others with a particular document category or type. Moreover, there is typically no closed loop feedback system that provides less skilled search users with information for improving their searching skills. Some less skilled search users may avoid highly technical documents due to apparent lack of relevancy, even though the highly technical document may be relevant to the search. Furthermore, when there are no relevant documents contained in a technical document group, there are no mechanisms to assist in identifying the need for adding new technical documents to the group.

SUMMARY

In a first aspect of the invention, there is a method implemented in a computer infrastructure comprising a combination of hardware and software. The method includes: receiving a search query from a search user; generating a ranked result set based on the search query; generating an adjusted ranked result set by adjusting the ranked result set based on a skill rating of the search user; and providing the adjusted ranked result set to the search user.

In another aspect of the invention, there is a system implemented in hardware and comprising a computer infrastructure operable to: receive a search query from a search user; generate a ranked result set by searching a document repository against the search query; and generate an adjusted ranked result set by adjusting the ranked result set based on a skill rating of the search user. The computer infrastructure is also operable to: provide the adjusted ranked result set to the search user; monitor a review of the adjusted ranked result set by the search user; and receiving a selection of a result document contained in the adjusted ranked result set from the search user. The computer infrastructure is further operable to: provide the result document to a recipient; receive feedback associated with the result document from the recipient; and adjust the skill rating of the search user based on at least one of the monitoring and the feedback.

In an additional aspect of the invention, there is a computer program product comprising a computer usable storage medium having readable program code embodied in the medium is provided. The computer program product includes at least one component operable to: receive a search query from a search user; perform a search of a document repository using the search query; generate an adjusted ranked result set based on the performing the search and a skill rating of the search user; provide the adjusted ranked result set to the search user; monitor a review of the adjusted ranked result set by the search user; receiving a selection of a result document contained in the adjusted ranked result set from the search user; and adjust the skill rating of the search user based on the monitoring.

In another aspect of the invention, there is a method of deploying a system for adjusting ranked search results based on user data. The method includes providing a computer infrastructure, being operable to: receive a search query from a search user; obtain a skill rating of the search user; generate a ranked result set by searching a document repository against the search query; generate an adjusted ranked result set by adjusting the ranked result set based on a previous search performed by another search user having a higher skill rating than the search user; provide the adjusted ranked result set to the search user; monitor a review of the adjusted ranked result set by the search user; receiving a selection of a result document contained in the adjusted ranked result set from the search user; and adjust the skill rating of the search user based on the monitoring.

In a further aspect of the invention, a computer system for at least one of modeling and forecasting technology adoption, the system comprises a CPU, a computer readable memory and a computer readable storage media. Additionally, the system comprises first program instructions to receive a search query from a search user. The system also comprises second program instructions to obtain a skill rating of the search user. The system further comprises third program instructions to generate a ranked result set by searching a document repository against the search query. The system additionally comprises fourth program instructions to generate an adjusted ranked result set by adjusting the ranked result set based on a previous search performed by another search user having a higher skill rating than the search user. The first, second, third, and fourth program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
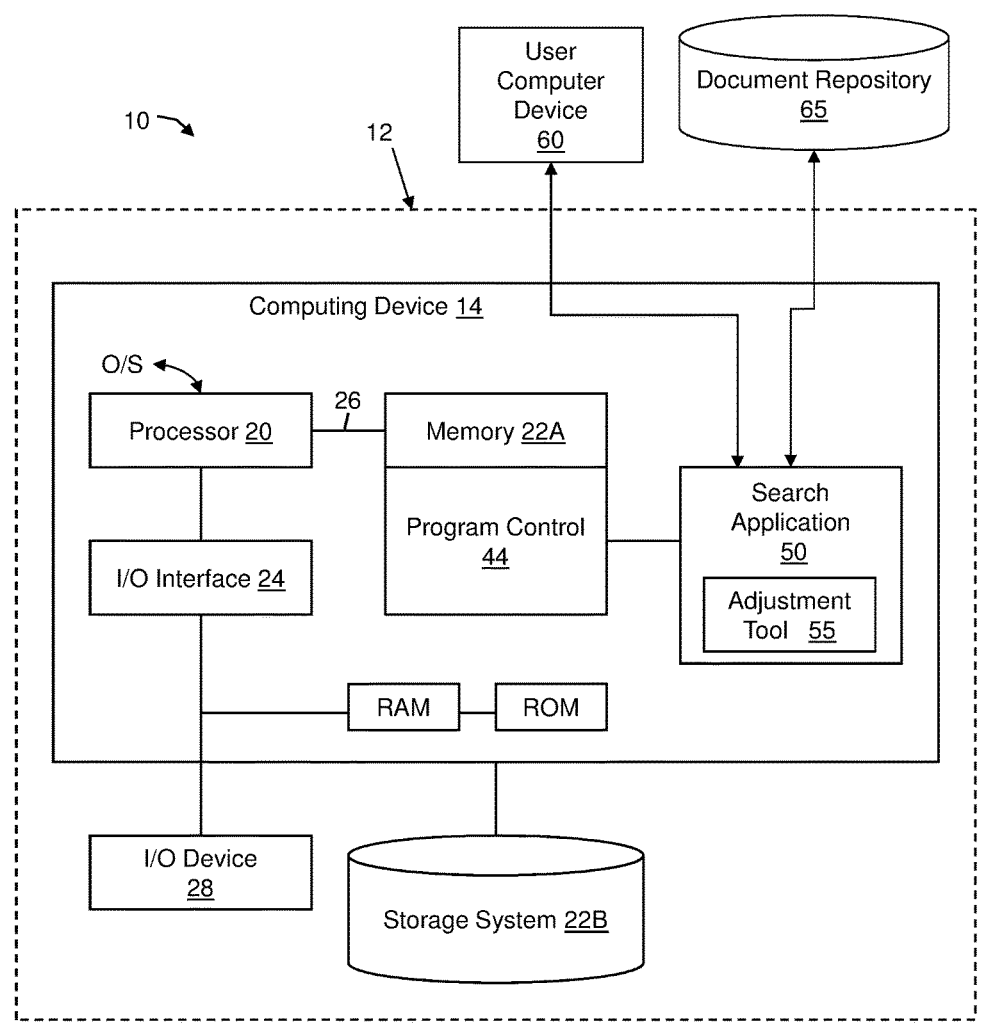
FIG. 1 an illustrative environment for implementing the steps in accordance with aspects of the invention.

The present invention generally relates to computer-based searching and, more particularly, to adjusting the ranking of search results based on information associated with the search user. According to aspects of the invention, a search user (e.g., searcher) is provided with a rating (e.g., score) associated with their level of searching skill, and the rankings of documents in a search result are adjusted based on the search user's skill rating. In embodiments, rankings of search results obtained by a less skilled searcher may be adjusted based on results of a similar search performed by a more skilled searcher. In additional embodiments, the skill rating of a searcher may be adjusted based on at least one of: relative location of a result document within a search result set, and feedback from a recipient regarding a relevance of the result document. In this manner, implementations of the invention may be used to improve computer-based searches.

Aspects of the present invention relate to systems and methods for adjusting a ranking of technical documents in a search result domain based on technical skill category and search skill ratings of the searcher within that technical skill category. The adjusting may be based on post-directed search result relevance for the documents selected in conjunction with characteristics of searches performed by more highly skilled searchers of the same technical skill category. Additional aspects of the present invention relate to systems and methods for adjusting a ranking of technical documents within a search result domain based on relevance and repository group (e.g. internal vs. external, development vs. support vs. customer related repository, etc.).

Further aspects of the present invention relate to systems and methods for using relevancy of search results to determine a lack of useful technical documentation within a skill category and document category or type. The lack of such documentation may be that of a pervasive need or a sparse need. Even further aspects of the present invention relate to systems and methods of skills enhancement for searchers within a skill category and document category or type through positive enhancement feedback derived from successful similar searches performed by more highly skilled searchers of the same skill category and document category or type. Still further aspects of the present invention also relate to systems and methods of adjusting document rankings for technical documents in a search result set from a skill category or document category or type based on elements such as skill level assessment of the searcher, and document intended audience as compared to the audience sets of the searcher.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a computer infrastructure comprising a server 12 or other computing system that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a search application 50 and a search adjustment tool 55 that is configured to perform one or more of the processes described herein. The search application 50 and adjustment tool 55 can be implemented as one or more program code in the program control 44 stored in memory 22A as separate or combined modules. Additionally, the search application 50 and adjustment tool 55 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The search application 50 may be any suitable application that accepts a search input from a user computer device 60, searches stored data (e.g., a document repository 65) based on the input, and returns a ranked result set to the user computer device 60. In accordance with aspects of the invention, the adjustment tool 55 maintains user data (e.g., skill rating) associated with individual search user and adjusts rankings of the result set returned by the search application 50 based on the user data. The search application 50 and adjustment tool 55 may be separate applications. For example, the adjustment tool 55 may be an add-on or plug-in used with an existing search application 50. In other embodiments, the functionality of the search application 50 and adjustment tool 55 may be provided by a single application.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
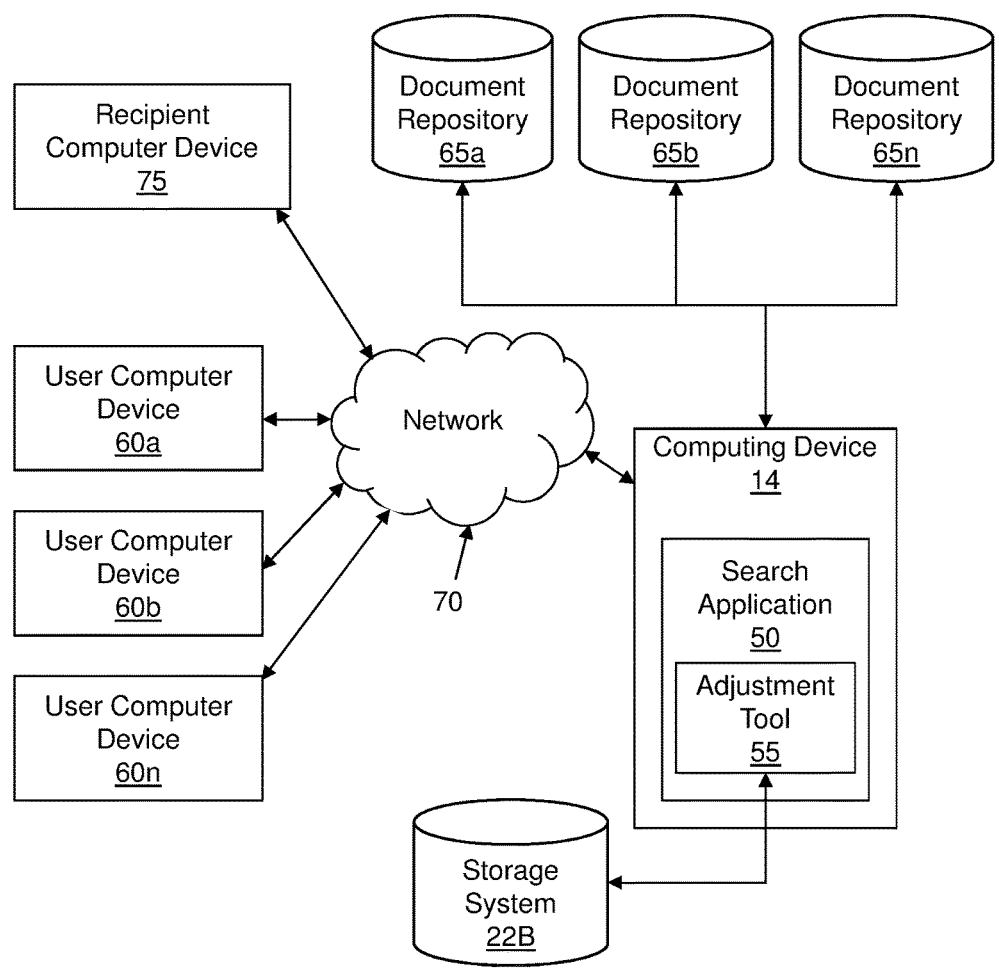
FIG. 2 shows a block diagram of a system in accordance with aspects of the invention.

FIG. 2 shows a block diagram of an exemplary system in accordance with aspects of the invention. In embodiments, the system includes the computing device 14 that runs the search application 50 and the adjustment tool 55. The computing device 14 is in communication with one or more document repositories 65a, 65b, . . . , 65n, the contents of which are searchable using the search application 50. One or more user computer devices 60a, 60b, . . . , 60n are in communication with the computing device 14 via a network 70. The user computer devices 60a-n may comprise any suitable computing device including, but not limited to, a desktop computer, laptop computer, tablet computer, etc. In embodiments, the user computer devices 60a-n may include a client program or software application that provides an interface to the search application 50, such that a search user (e.g., a searcher) may utilize using one of the user computer devices 60a-n to perform a search of the documentation stored in the one or more document repositories 65a-n.

Still referring to FIG. 2, a recipient computer device 75 may also be in communication with one of the user computer devices 60a-n via the network 70. In embodiments, the recipient is a person who requests that a search be performed, and to whom a document (or documents) found via the search is ultimately provided. For example, the recipient may utilize the recipient computer device 75 to communicate a search request to one of the user computer devices, e.g., 60a, associated with a search user. The search user may then utilize the user computer device 60a to perform a search of one or more document repositories 65a-n using the search application 50, the search being based on the search request of the recipient.

According to aspects of the invention, the search application 50 generates a ranked result set based on the search query submitted by the search user, and the adjustment tool 55 adjusts rankings of documents contained in the result set based on user data associated with the search user (e.g., user skill rating). The adjustment tool 55 may store and access different skill ratings for different search users in storage system 22B. The search user may perform plural searches in fulfilling the search request of the recipient. Ultimately, the search user selects at least one document from the ranked result set(s), and forwards this document (or a link to the document) to the recipient computer device 75. The recipient computer device 75 may be within the same organization as the user computer device 60a. Alternatively, the recipient computer device 75 may be outside the organization of the user computer device 60a, in which case the network 70 may comprise the Internet. In other embodiments, the recipient computer device 75 and the user computer device 60a may be the same.

As used herein, a recipient is a person or entity that requests a search by a search user and subsequently receives a search result document selected by the search user. In some embodiments, the recipient and the search user may be the same. The search user (e.g., searcher) is a person who performs a search using a search engine (e.g., the search application 50). A skill category definition is a document describing the types of categories for which a skill is defined. This could be an area of expertise, a category of document content, etc., an example being a knowledge base functional area. A document category or type definition is used to describe a classification or type of document with respect to any of several factors, some of which may include the skill level required to use the document, the type or level of document (internal vs. external, development vs. support, privileged vs. non-privileged, etc.). A document database is an example of a document category or type definition. A user search session may be a timeframe for which searches related to a particular subject may be performed by a search user. The time frame may be bounded by a login/logoff event and/or a time frame of inactivity. In additional embodiments, the time frame may bound by the dispatch of a problem record or other work assignment unit. Also, saved search sessions across re-dispatch to the same problem record or work assignment unit may provide additional search user skill information by reestablishing the context of previous searches in that associated session. A results click-through is a list of data (e.g., hyperlinked data) that provides a ranked result set from the expected search, e.g., from the search application 50.

In embodiments, the document repositories 65a-n are pre-configured document repositories (e.g., private and/or proprietary databases), as opposed to the open-ended World Wide Web, and the search application 50 is a local search application that searches only the one or more document repositories 65a-n. The scope of the invention is not limited to this configuration, however, and aspects of the invention may be implemented with searches performed on the World Wide Web. The network 70 connecting the computing device 14 and the user computer devices 60a-n may be any type of network, such as a local area network (LAN) or a wide area network (WAN) including the Internet.

The search application 50 may comprise plural different search applications. For example, a first search application may be directed to searching information technology support documents stored in one of the document repositories 65a-n, and a second search application may be directed to searching legal documents stored in another one of the document repositories 65a-n. The invention is not limited to these two examples, and any number of any types of search application may be used within the scope of the invention. Each separate search application may be embodied as a separate application running on the computing device 14 or, alternatively, separate search applications may run on separate servers.

Flow Diagrams

Figure 3:
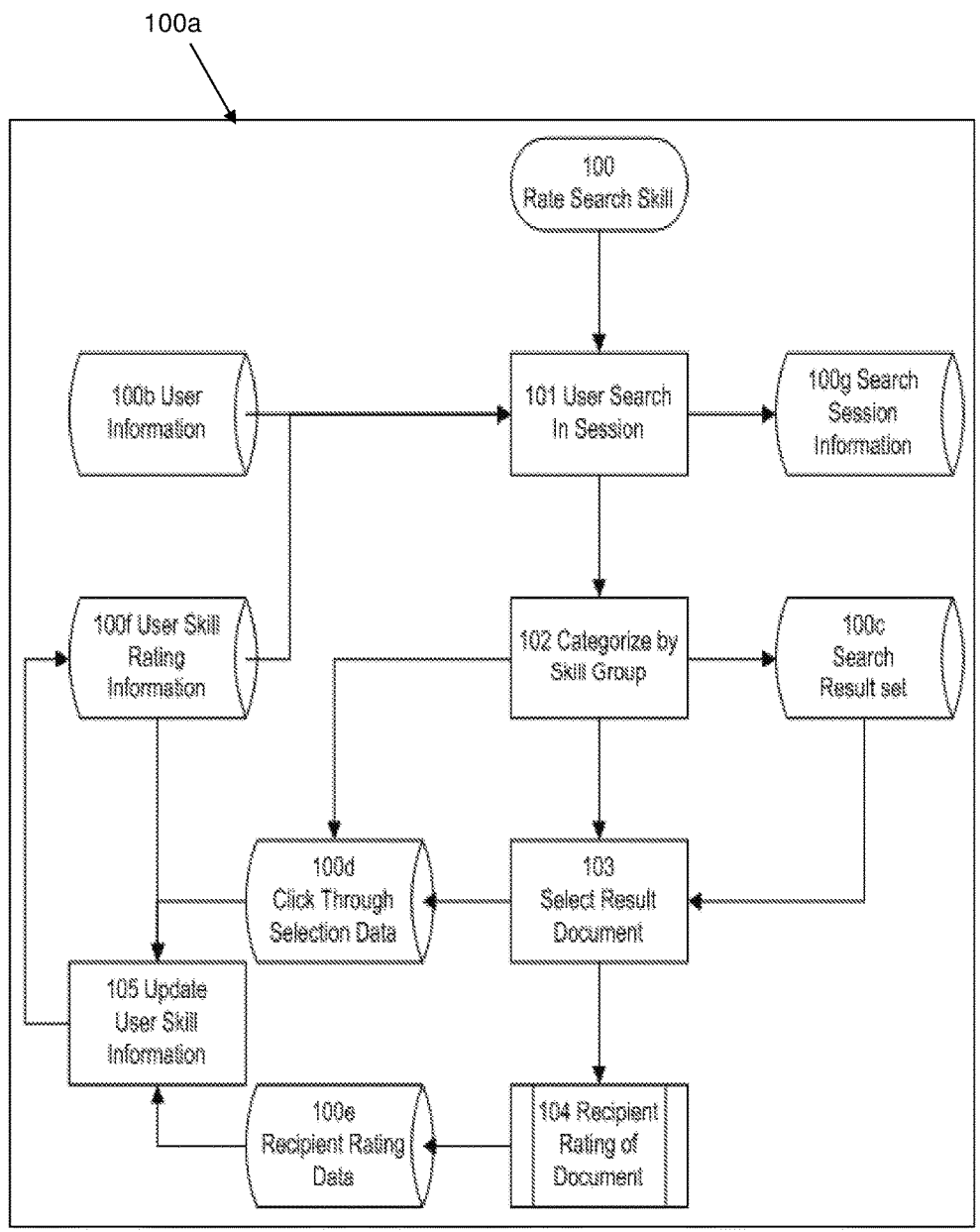
FIGS. 3 and 4 show exemplary flow diagrams for implementing methods in accordance with aspects of the invention.
Figure 4:
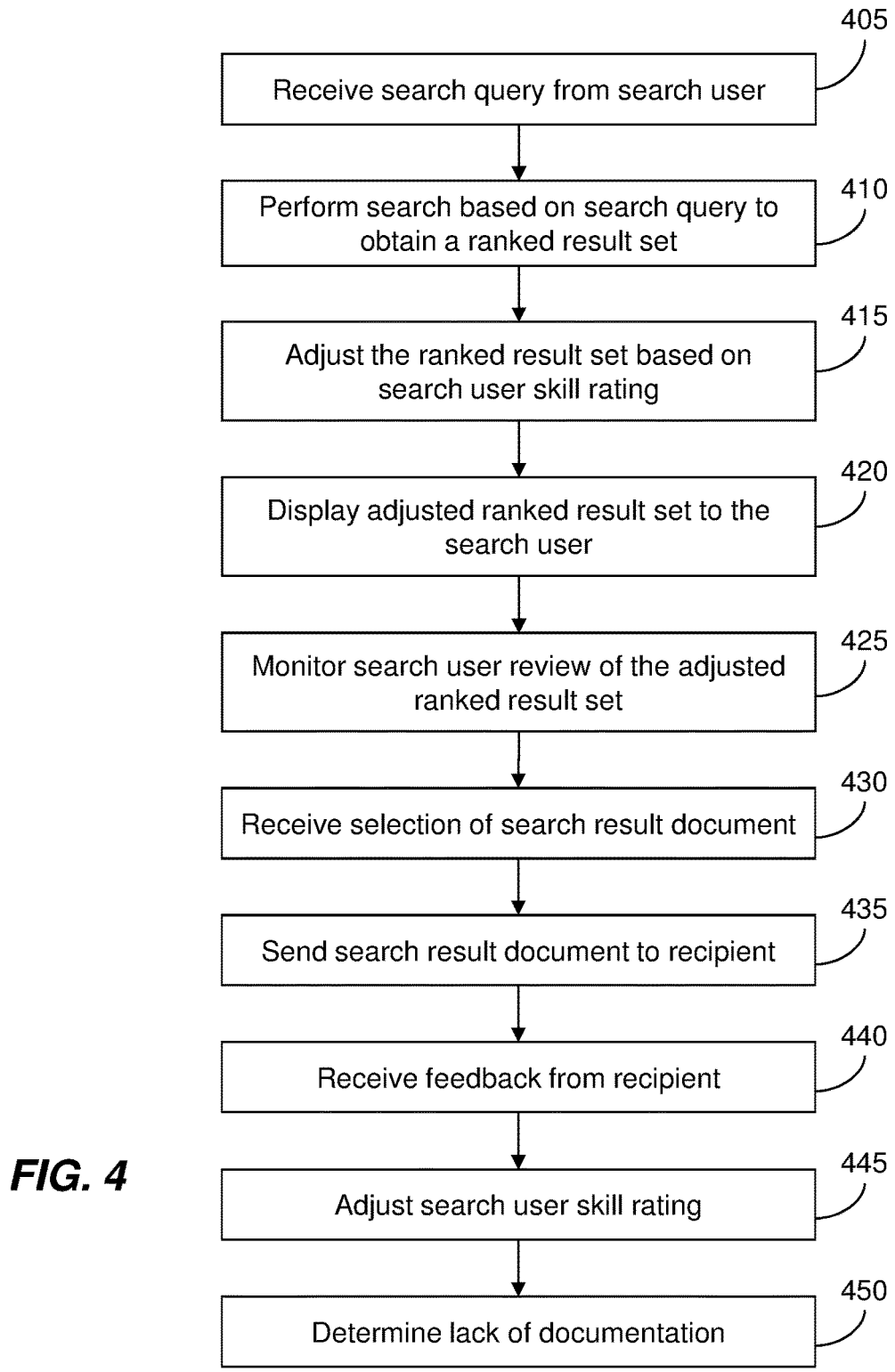

FIGS. 3 and 4 show exemplary flow diagrams for performing aspects of the present invention. The steps of FIGS. 3 and 4 may be implemented in the environment of FIGS. 1 and 2, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1 and 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

FIG. 3 depicts an exemplary flow diagram depicting functionality in accordance with aspects of the present invention. Block 100a depicts a user search session that may be performed using a user computer device 60a as described with respect to FIG. 2. In embodiments, the user search session may be bounded by various constraints such as, but not limited to, a time frame, dispatch or work unit, an inactivity time, a login and logoff, or logon followed by inactive time after searches. Additional contextual elements stored in association with the search session may include an identification of the search user, the category of the search elements, and an index to the search session.

Block 100 illustrates obtaining a skill rating of the search user associated with the search session 100a. The skill rating may be based on the accuracy of finding documents in previous search sessions with respect to a skill category and within a document category or type, and from document usefulness feedback being incorporated back into a user skill rating data store (e.g., block 1000. The skill rating may be determined and/or obtained by the adjustment tool 55 depicted in FIGS. 1 and 2.

Still referring to FIG. 3, block 101 illustrates a search performed by the search user during the session 100a. The search may comprise, for example, the search user employing user computer device 60a to submit a search query to the search application 50, as described with respect to FIG. 2. The search application generates a ranked result set based on the search query. Block 101 also includes the adjustment tool adjusting the ranked result set generated by the search application. In embodiments, the adjustment is based on user information 100b and/or user skill rating information 100f. Block 100g illustrates stored search session information associated with the particular search session 100a including, but not limited to, search queries entered by the search user during the particular search session 100a.

Block 102 illustrates assigning categories to the documents included in a ranked result set that is returned from the search at block 101. The categories may be assigned by the adjustment tool, and may be defined in any suitable manner, including, but not limited to: a type of tag (e.g., a hypertext tag), a form type, and a category selector tag. After the categories are assigned at block 102, the ranked result set is temporarily stored as depicted in block 100c. In embodiments, the adjustment tool performs the assigning at block 102 and the storing at block 100c.

Block 103 illustrates the search user selecting a document from the ranked result set. The document selected at block 103 represents a search result document that is provided to the recipient, e.g., the person or entity who requested the search as described in FIG. 2. Prior to selecting the search result document at block 103, the search session 100a may include plural searches (e.g., block 101), each of which includes the search user reviewing one or more documents in respective ranked results sets. In embodiments, the adjustment tool monitors and records data associated with actions taken by the search user leading up to the selection of the search result document at block 103. For example, the adjustment tool may monitor the order in which documents were presented to the search user in a ranked result set, as well as an order in which the search user reviewed documents contained in the ranked result set prior to selecting the search result document at block 103. The adjustment tool may store this data, for example, as click through selection data depicted by block 100d.

The click through selection data 100d may also include the time it takes for the search user to click through the ranked result set before selecting the search result document at block 103. The click through selection data 100d may additionally comprise the page number of a group of similarly sized or grouped selections. In some embodiments, the category of a document that the search user reviews (e.g., clicks on in a ranked result set) may be used as a basis for determining whether to include the document in the click through selection data 100d.

Still referring to FIG. 3, block 104 illustrates a mechanism for the recipient of the search result document to provide feedback regarding a perceived level of usefulness or helpfulness of the search result document. In embodiments, the recipient is the person who requested the search be performed, and block 104 depicts the recipient providing feedback as to whether the search result document meets the needs of the requested search. The feedback may have any suitable form, such as, but not limited to, numerical ranking (e.g., score of 1 to 5), two value ranking (e.g., helpful or not helpful), etc. The feedback may be provided via the recipient computer device (e.g., recipient computer device 75 as described with respect to FIG. 2) and received by the adjustment tool. Data associated with the recipient rating may be stored as depicted at block 100e. In embodiments, the data associated with the recipient rating is stored with an index key to the search session information 100g.

Block 105 depicts updating the skill rating of the search user associated with the search session 100a. In embodiments, the adjustment tool adjusts the skill rating of the user based on the current skill rating (e.g., from block 100f) and at least one of the click through selection data 100d and the recipient rating data 100e. For example, when the click through selection data 100d indicates that the search user performed an efficient search, the adjustment tool may increase the skill rating of the search user. Similarly, when the recipient rating data 100e is positive, the adjustment tool may increase the skill rating of the search user. Conversely, when the click through selection data 100d indicates that the search user performed an inefficient search and/or when the recipient rating data 100e is negative, the adjustment tool may decrease the skill rating of the search user. The new skill rating of the search user is then stored at block 100f, and can be used in subsequent search sessions.

In embodiments, the adjustment tool may determine the efficiency (or inefficiency) indicated by the click through selection data 100d (e.g., as described with respect to adjusting the search user skill rating at step 105) in any desired manner. In one example, the adjustment tool compares the time of the search session 100a to a threshold value. The adjustment tool may determine that the search is efficient when the time is less than the threshold value, and that the search is inefficient when the time is greater than the threshold value. In another example, the efficiency may also be used to adjust the amount of skill increase/decrease by the adjustment of user skill A correct result that take more time achieve (e.g. more documents reviewed) may provide less of an increase in skill rating than a correct result that takes less time to achieve. Conversely, an incorrect result that take more time achieve (e.g. more documents reviewed) may provide more of a decrease in skill rating than an incorrect result that takes less time to achieve. In another example, the adjustment tool compares the number of documents reviewed (e.g., clicked on) by the search user during the search to a second threshold value. The adjustment tool may determine that the search is efficient when the number of reviewed documents is less than the threshold value, and that the search is inefficient when the number of reviewed documents is greater than the threshold value. In yet another example, the adjustment tool compares the rank of the search result document in the ranked result set (e.g., first, second, tenth, etc.) to a third threshold value. The adjustment tool may determine that the search is efficient when the rank of the search result document is better than the threshold value, and that the search is inefficient when the rank of the search result document is worse than the threshold value. These parameters (e.g., time, number of documents reviewed, and rank of the search result document) may be stored as part of the click through selection data 100d.

Other parameters besides, or in addition to, the time, number of documents reviewed, and rank of the search result document may be used in determining the efficiency of the search. Moreover, plural such parameters may be used in determining the efficiency of the search. For example, the adjustment tool may compute a weighted average based on a plurality of such parameters, such as the ordinal value of when the search result document was chosen from the list and the amount of time that elapsed before the search result document was selected.

With continued reference to FIG. 3, the ranked result set 100c may also include information that was used to select the ranking for the search result document, and this information may be used for additional ranking assessment. Moreover, certain terms within a search query (e.g., at block 101) may be used to alter the preferred document category or type, which can employ a tier method to return documents requiring a different level or type of skill In the ranked result set 100c, a ranking may include a value that describes the percentage of relevance against 100 percent that a particular document may be in the results. Within such a ranking system, a threshold may be employed to identify whether the results contain relevant results.

In further embodiments, multiple searches across various search users with similar or mostly the same key words or elements may be used to determine that a pervasive need exists within the searched document repositories. Such similar searches could also include variants such as misspellings, synonyms, and even homonyms when compared for relevancy to determine that the searches were for the same lack of documentation.

In accordance with further aspects of the invention, a skill result set based on existing relevance measures for documents may be augmented with information queried from user information 100b and user skill rating information 100f. This information may include the skill level of the search user and a potential skill category based on search category derived from the input search parameters to the search user query. For example, when a search user skill category is at one setting, the search results may be augmented to provide categorized results from a particular document or skill category higher than others. In another example, a choice of similar search queries based on those searches performed by higher skilled search users in the same skill category may be employed to augment the search results of a lower skilled search user, thereby increasing the ranking of certain results from the higher skilled search user in the ranked results list provided to the lower skilled search user. The adjustment tool may be programmed to take into account the order in which the higher skilled search user selected the documents, thereby increasing the ranking of those documents for a subsequent similar search query performed by a lower skilled search user. In another example, the adjustment tool takes into account the recipient rating data 100e of documents as provided by the most similar search queries to increase the ranking of such documents in a ranked results list 100c of a subsequent similar search. Moreover, combinations of these techniques may be employed.

In additional embodiments, the adjustment tool displays hints or other educational information to the search user. For example, the adjustment tool may display similar search queries submitted by higher skilled search users, e.g., in a side bar of the search user display.

In still further embodiments, the adjustment tool permits a search user to tag a document as highly relevant in a particular category. The tag may be used to increase the ranking of the document in a ranked results list 100c of a subsequent similar search in the same category. The tag may include keywords that are used to increase the ranking when those combinations of keywords are present in the search terminology, including synonyms.

In additional embodiments, the adjustment tool uses the user information 100b to adjust the search query at block 101. For example, the user information 100b may include data identifying a primary language of the search user. Using this data, the adjustment tool may employ a linguistic dictionary for adjusting terms within the search query or contextual terms within a search question.

FIG. 4 shows a flow diagram depicting steps of a process in accordance with aspects of the present invention. At step 405, a computing device (e.g., computing device 14 running search application 50 depicted in FIGS. 1 and 2) receives a search query from a search user (e.g., via user computer device 60a). At step 410, the search application searches a data store (e.g., one or more document repositories 65a-n) based on the search query from step 405 and generates a ranked result set.

At step 415, the computing device adjusts the ranked result set that was generated by the search application at step 410. The adjusting may be based on a previous search performed by another search user having a higher skill than the search user who entered the search query at step 405. For example, an (e.g., adjustment tool 55 running on the computing device 14) may identify similar prior queries of higher skilled searchers by comparing the search query of step 405 to search queries previously submitted by other search users. A similar prior query may be one in which a threshold number or percentage of words are the same as the query of step 405. A higher skilled search user is a search user whose skill rating has a higher value than the skill rating of the search user who submits the search query at step 405. Data regarding skill ratings and prior search queries of other search users may be accessed by the adjustment tool via stored user information (e.g., depicted by block 100b in FIG. 3) and stored search session information (e.g., depicted by block 100g in FIG. 3). Step 415 may include the adjustment tool obtaining the skill rating of the search user from data storage.

Upon identifying at least one similar prior query by a higher skilled search user, the adjustment tool determines which document was selected as the result document by the higher skilled user in the similar prior query, and increases the ranking of that document in the ranked result set that was generated at step 410. For example, the ranked result set may initially include "Document A" ranked as the fifth most relevant document at step 410. When the adjustment tool determines that a higher skilled search user selected "Document A" as the result document of a similar prior query, then at step 415 the adjustment tool changes the ranking of "Document A" from the fifth most relevant document to the first most relevant document (e.g., moves "Document A" to the top of the ranked result set). The number of positions that "Document A" is moved in the ranked result set (e.g., from fifth to first) may vary based on at least one of: degree of similarity between the current search query and the similar prior query; degree of skill rating difference between the higher skilled search user and the current search user; and positive or negative feedback provided by a recipient of "Document A" during the similar prior query.

Another example of adjusting the ranking at step 415 involves the adjustment tool determining that a higher skilled search user has previously tagged one or more documents as being highly relevant within the particular domain or category in which the current search user is performing the current search. For example, the search query at step 405 may include an indication of a particular domain or category. In embodiments, the adjustment tool analyzes user information and search session information to determine that a higher skilled searcher has, during a pervious search, tagged one or more documents as being highly relevant within the particular domain or category. The adjustment tool then adjusts (e.g., increases) the ranking of any of the one or more tagged documents that are included in the ranked result set generated at step 410. The amount of the adjustment in ranking may vary based upon any desired factors, such as number of tags associated with a document, type of tags, skill rating of other searchers who applied the tags, etc.

At step 420, the adjusted ranked result set (e.g., from step 415) is displayed to the search user in a conventional manner. At step 425, the adjustment tool monitors the search user's review of the adjusted ranked result set. For example, the adjustment tool may store a record of which documents the search user reviews (e.g., opens to read, etc.), how long a period of time the search user spends with this adjusted ranked result set, etc. This data may be stored, for example, as the click through selection data 100*d* depicted in FIG. 3.

Step 420 may optionally include displaying hint or educational information to the search user. For example, the adjustment tool may cause the user computer device to display a similar search query that was previously submitted by a higher skilled user. The adjustment tool may identify such a similar search query that was previously submitted by a higher skilled user in a similar manner as described above with respect to step 415. The hint or educational information may be displayed in any suitable manner, such as in a particular portion (e.g., a sidebar) of the search application interface displayed at the user computer device.

At step 430, the adjustment tool receives an indication of the search result document selected by the search user from the adjusted ranked result set. At step 435, the search result document is transmitted to the recipient. At step 440, the adjustment tool receives feedback from the recipient regarding the search result document. The feedback data may be stored, for example, as the recipient rating data 100*e* described with respect to FIG. 3.

At step 445, the adjustment tool adjusts the skill rating of the search user. In embodiments, the adjustment tool increases or decreases the skill rating based on at least one of the click through selection data (e.g., from step 425) and the recipient rating data (e.g., from step 440). This may be performed in a manner similar to that described with respect to block 105 in FIG. 3. The adjusted skill rating of the search user may be stored (e.g., in user information 100*b*) for use in subsequent searches.

At step 450, the adjustment tool optionally determines whether there is a lack of documentation in a particular domain or category. In embodiments, the adjustment tool analyzes the click through selection data (e.g., from step 425) to determine whether the current search was inefficient. The adjustment tool may also analyze the recipient rating data (e.g., from step 440) to determine whether the search result received negative feedback from the recipient. In the event that either is true (i.e., the search was inefficient and/or the search result received negative feedback), the adjustment tool then analyzes previous searches that were conducted in the same domain or category as the current search. In this manner, the adjustment tool may determine a number of searches in this particular domain or category that are inefficient and/or received negative feedback.

Still referring to step 450, in embodiments, the adjustment tool compares this determined number of searches to a threshold value (e.g., as a gross number or a percentage of total searches performed in this particular domain or category). The adjustment tool may determine that there is not a lack of documentation in this particular domain or category when the number is less than the threshold value. On the other hand, the adjustment tool may determine that there is a lack of documentation in this particular domain or category when the number is greater than the threshold value. In embodiments, the adjustment tool transmits a message (e.g., an alert) to an administrator when there is a determined lack of documentation in a particular domain or category. The message may include information such as an identification of the particular domain or category and statistics used in the analysis at step 450.

As described herein, embodiments of the present invention involve enhancing computer-based searching by employing usefulness ratings of information provided by search users to produce an enhanced search result set that may provide stronger and more useful results as the primary entries in the search result set. In this manner, implementations of the invention are usable to: enhance the apparent skills of lower skilled searchers, increasing the level of service they provide; rate the skill of searchers to further enhance aspects of the reputation of the users of the repositories of information; identify when relevant documents do not exist for a given issue set after applying search augments; educate lower skilled users through search hints designed to enhance their search skills as well as their skill in the art of interest; provide understandable results to a searcher based on the searcher's skill level; increase the chance of a hit (e.g., a useful result) in a search through specific skill rating by a higher skilled searcher; identify pervasiveness of a need that is undocumented in the repository; adjust the likelihood of a result from a particular document repository over another because of some aspect of that repository (e.g., development documents vs. support documents, statute vs. regulation vs. case history, medical research statement, etc.); and improve the search results for those searchers whose skill in the primary language of the documents being searched is augmented by a typical linguistic characteristic.

Implementations of the invention may be advantageously utilized in, for example, roles such as technical support, legal support services, medical support services, and other support services roles where the particular skill that is used to provide that support makes a difference in the quality of the deliverable of the organization. Implementations of the invention are not limited to these exemplary roles, however, and may instead be utilized in any suitable manner. Embodiments advantageously provide added consistency, leveling of the skills playing field for relevant documentation, and added skills enhancement and passive mentoring for those that are lower skilled searchers in those organizations. Embodiments further provide linguistic consistency for support organizations that are composed of personnel having differing primary languages, whose language of service is not necessarily the same as the primary language of some of those personnel.

As described herein, implementations of the invention may provide methods and systems for determining the skill of a search user based on the accuracy of finding relevant documents within a search session with respect to at least one of: a skill category being searched within, document category or type, document usefulness feedback for the user, and document selection data based on the search. Aspects of the invention also include methods and systems for assigning document relevancy for documents within a skill category based on document selection by the searcher as well as skill level of the searcher within the skill category and document category or type. According to additional aspects of the invention, there are methods and systems for adjusting the search results based on document category or types and skill categories of the user such that preferred document types receive higher rankings based from profile and skill level data within the skill category of the searcher. Further aspects of the invention provide methods and systems for identifying searches within a skill category and document category or type where no relevant results exist.

According to additional aspects of the invention, there are methods and systems for educating lower skilled searchers through the use of search input and result data from higher skilled searchers in a skill category and document category or type with respect to the search used by the lower skilled user. There are also methods and systems for adjusting search results of documents within a skill category and document category or type based on the accuracy and skill level of the searcher within the skill category and document repository. Implementations of the invention provide methods and systems for identifying a pervasive issue that has no useful documentation within a skill category or document category or type such that a skill level action may be taken. Aspects of the invention also provide methods and systems for flagging documents such that an increased relevance will occur for various searches by lower skilled searchers within a skill category and document category or type. Even further aspects of the invention provide methods and systems for mapping a search argument and given search results from a skill category and document category or type across layered tiers of document repositories. Still further aspects of the invention provide methods and systems for accounting for apparent lower skill based on users having a primary spoken and written language other than that of the searched document domain.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure comprising a combination of hardware and software, the method comprising:

generating a ranked result set based on a search query;

generating an adjusted ranked result set based on a skill rating of a search user;

determining an efficiency of the search by click through selection data which includes a time it takes for the search user to click through the adjusted ranked result set before selecting a result document contained in the adjusted ranked result to generate a modified skill rating of the searcher in view of the amount of documents clicked on by the search user prior to achieving the result document, wherein the more documents clicked on by the search user the less of an increase in the skill rating of the search user;

monitoring a review of the adjusted ranked result set by the search user, wherein the monitoring comprises monitoring time spent reviewing the adjusted ranked result set; and storing the modified skill rating of the searcher based on the determined efficiency.

2. The method of claim 1, wherein the monitoring further comprises monitoring at least one of: a number of documents reviewed in the adjusted ranked result set; and a rank of the result document contained in the adjusted ranked result set.

3. The method of claim 2, further comprising adjusting the skill rating of the search user based on the monitoring.

4. The method of claim 1, further comprising:
providing the result document to a recipient; and
receiving feedback associated with the result document from the recipient.

5. The method of claim 4, further comprising adjusting the skill rating of the search user based on at least one of the monitoring and the feedback.

6. The method of claim 4, further comprising determining a lack of documentation in a domain or category based on the feedback.

7. The method of claim 1, wherein the adjusting the ranked result set based on the skill rating of the search user comprises:
identifying at least one document that is in both the ranked result set and a similar search performed by another search user having a higher skill rating than the search user; and
changing a ranking of the at least one document in the ranked result set based on the identifying.

8. The method of claim 1, wherein the adjusting the ranked result set based on the skill rating of the search user comprises:
identifying at least one document that has been tagged by another search user having a higher skill rating than the search user; and
changing a ranking of the at least one document in the ranked result set based on the identifying.

9. The method of claim 8, wherein the identifying the at least one document comprises determining that the at least one document is contained in a same domain or category as the search query from the search user.

10. The method of claim 1, further comprising providing a hint or educational information to the search user based on a similar search performed by another search user having a higher skill rating than the search user.

11. The method of claim 10, wherein the ranked result set includes a ranking having a value that describes a percentage of relevance against 100 percent that a particular document is in the ranked result set.

12. The method of claim 11, further comprising generating a set of documents from a skill set of the search user.

13. The method of claim 12, wherein the skill set of the search user is based on the skill rating of the user.

14. The method of claim 13, further comprising augmenting the skill result set of documents based on a search category derived from input search parameters inputted by the search user into the search query.

15. The method of claim 14, further comprising accounting an order in which the search user clicked on the documents, thereby increasing a ranking of the clicked on documents for a subsequent similar search query performed by a lower skilled search user.

16. The method of claim 15, further comprising identifying a language of the search user to employ a linguistic dictionary for adjusting terms within the search query.

17. The method of claim 16, further comprising:
receiving feedback associated with the result document from a recipient which was provided with the result document;
adjusting the skill rating of the search user based on the monitoring and the feedback; and
determining a lack of documentation in a domain or category based on the feedback.

18. A system implemented in hardware and comprising a computer infrastructure configured to:
receive a search query from a search user;
enter terms within the search query to alter a preferred document type to employ a tier arrangement to return documents requiring a type of skill from the search user;
generate a ranked result set of documents in view of the type of skill by searching a document repository against the search query, wherein the ranked result set includes a ranking having a value that describes a percentage of relevance against 100 percent that a particular document is in the ranked result set;
generate an adjusted ranked result set of documents based on a skill rating of the search user;
monitor a review of the adjusted ranked result set of documents by the search user, wherein the monitoring comprises monitoring time spent reviewing the adjusted ranked result set;
receive a selection of a result document contained in the adjusted ranked result set of documents;
determine an efficiency of the search session by comparing a time of the search session to a threshold value;
adjust the skill rating of the search user based on the efficiency; and
store the adjusted skill rating of the searcher based on the efficiency.

19. The system of claim 18, wherein the computer infrastructure is further operable to determine a lack of documentation in a domain or category based on feedback associated with the result document.

* * * * *